United States Patent
Smithson et al.

(10) Patent No.: US 6,322,018 B1
(45) Date of Patent: Nov. 27, 2001

(54) LOCKBAR FOR A SEATBELT RETRACTOR

(75) Inventors: Alan George Smithson; David Blackadder; Paul Bowman, all of Carlisle; Joseph Patrick Harte, Maryport; John Taylor, Penrith; Nigel Mitchinson, Carlisle, all of (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/542,323

(22) Filed: Apr. 4, 2000

(30) Foreign Application Priority Data

Sep. 17, 1999 (GB) .................................... 9922104

(51) Int. Cl.[7] .................................... B60R 22/36
(52) U.S. Cl. .......................... 242/384; 242/382
(58) Field of Search ................. 242/382–384.6; 280/806; 297/478

(56) References Cited

U.S. PATENT DOCUMENTS

| 4,050,644 | * | 9/1977 | Fohl | 242/384.6 |
| 5,388,780 | * | 2/1995 | Matsuki | 242/384 |
| 6,241,173 | * | 6/2001 | Wier | 242/382 |

FOREIGN PATENT DOCUMENTS

| 3144340 | 8/1982 | (DE) . |
| 9413087 | 10/1994 | (DE) . |
| 29807433 | 8/1998 | (DE) . |
| 0917999 | 5/1999 | (EP) . |
| 0919441 | 5/1999 | (EP) . |
| 0952048 | 10/1999 | (EP) . |
| 2347900 | 9/2000 | (GB) . |
| WO 9506576 | 3/1995 | (WO) . |

* cited by examiner

Primary Examiner—John M. Jillions
(74) Attorney, Agent, or Firm—Lonnie Drayer; Jarett Rieger

(57) ABSTRACT

A lockbar for a seatbelt retractor has an elongate joining member and two end pieces joined to the joining member at opposite ends therefore. The end pieces are made of a higher strength material than the joining member. The joining member may be made by extrusion and may be tubular or may be formed as a hollow member. The end pieces may be produced as forgings, die casting or plastic injection moldings or by other suitable methods. They can be produced from different materials and to different designs to suit the specification of the seatbelt retractor. Hence a single basic seatbelt retractor design can be employed for a variety of strength requirements by selecting appropriate end pieces and an appropriate joining member.

16 Claims, 3 Drawing Sheets

LOCKBAR FOR A SEATBELT RETRACTOR

FIELD OF THE INVENTION

The present invention relates to a seatbelt retractor, and specifically to a lockbar for a seatbelt retractor.

BACKGROUND OF THE INVENTION

A seatbelt generally comprises belt webbing that passes over a vehicle occupant's torso to restrain forward movement in a crash. The webbing is wound on a spool that is mounted in the retractor for rotation about its longitudinal axis to wind in or pay out webbing. The spool is biased in a winding in direction by a spiral spring. A sensor detects a crash, for example by detecting acceleration or deceleration above a predetermined level. The crash sensor activates a locking mechanism to lock the spool against rotation and prevent further pay out of webbing thus restraining the occupant against forward motion.

The spool is locked by engagement of teeth on a ratchet wheel on the edge of the spool with a locking pawl. Often two locking pawls are used mounted at opposite ends of a bar extending the length of the spool so as to lock both ends simultaneously. Such a lockbar is traditionally made in one piece of a single type of material, for example as a metal die casting.

However, die cast parts are inherently rather weak and the traditional U-shaped lockbar is complex to manufacture.

The present invention provides an improved lockbar for a seatbelt retractor and an improved method of manufacturing or assembling a lockbar.

SUMMARY OF THE INVENTION

According to the present invention, there is provided a lockbar for a seatbelt retractor comprising at least three parts separately manufactured and subsequently connected together.

According to a preferred embodiment of the present invention, the lockbar comprises an elongate joining member and two end pieces joined to the joining member at opposite ends therefore, the end pieces being made of a higher strength material than the joining member. In one embodiment the end pieces are of a generally L-shaped form.

The joining member may be made by extrusion and may be tubular or may be formed as a hollow member, for example, of prismatic form (i.e., with a triangular cross-section). It is preferably designed to have relatively high torsional and axial stiffness but can be made of relatively low strength material such as aluminum or glass-filled plastic.

The end pieces may be produced as forgings, die casting or plastic injection moldings or by other suitable methods. They can be produced from different materials and to different designs to suit the specification of the seatbelt retractor. For example, forged aluminum or steel end pieces are envisaged. These materials have a higher mechanical strength and a better metallurgical microstructure than die cast parts.

Hence a single basic seatbelt retractor design can be employed for a variety of strength requirements by selecting appropriate end pieces and an appropriate joining member.

The end pieces, being either generally flat or L-shaped are easier to manufacture than the traditional one piece U-shaped lockbar.

The end pieces may be attached to the joining member in a variety of ways to suit the strength requirements and the materials from which the parts are made.

For example, the joining member may be hollow along its whole length or at its end to accommodate projections on the end pieces in the form of bars or pins. Alternatively, extending pins on the ends of the joining member may fit into holes in the end pieces. The joints may be made stronger by pressing, spot welding, riveting, over molding, over casting and/or by using adhesive.

The end pieces also generally comprise pin formations for guidance purposes that interact with features in the retractor mechanism to move the end pieces into locking positions. These may be formed as separate pieces and inserted or otherwise attached. They may be formed by pressing out, semi-shearing, over molding, over casting, cold forging, friction welding or other suitable methods.

BRIEF DESCRIPTION OF THE DRAWINGS

For a better understanding of the present invention and to show how the same may be carried into effect, reference will now be made by way of example to the accompanying drawings in which.

DETAILED DESCRIPTION OF THE INVENTION

Figure 1:
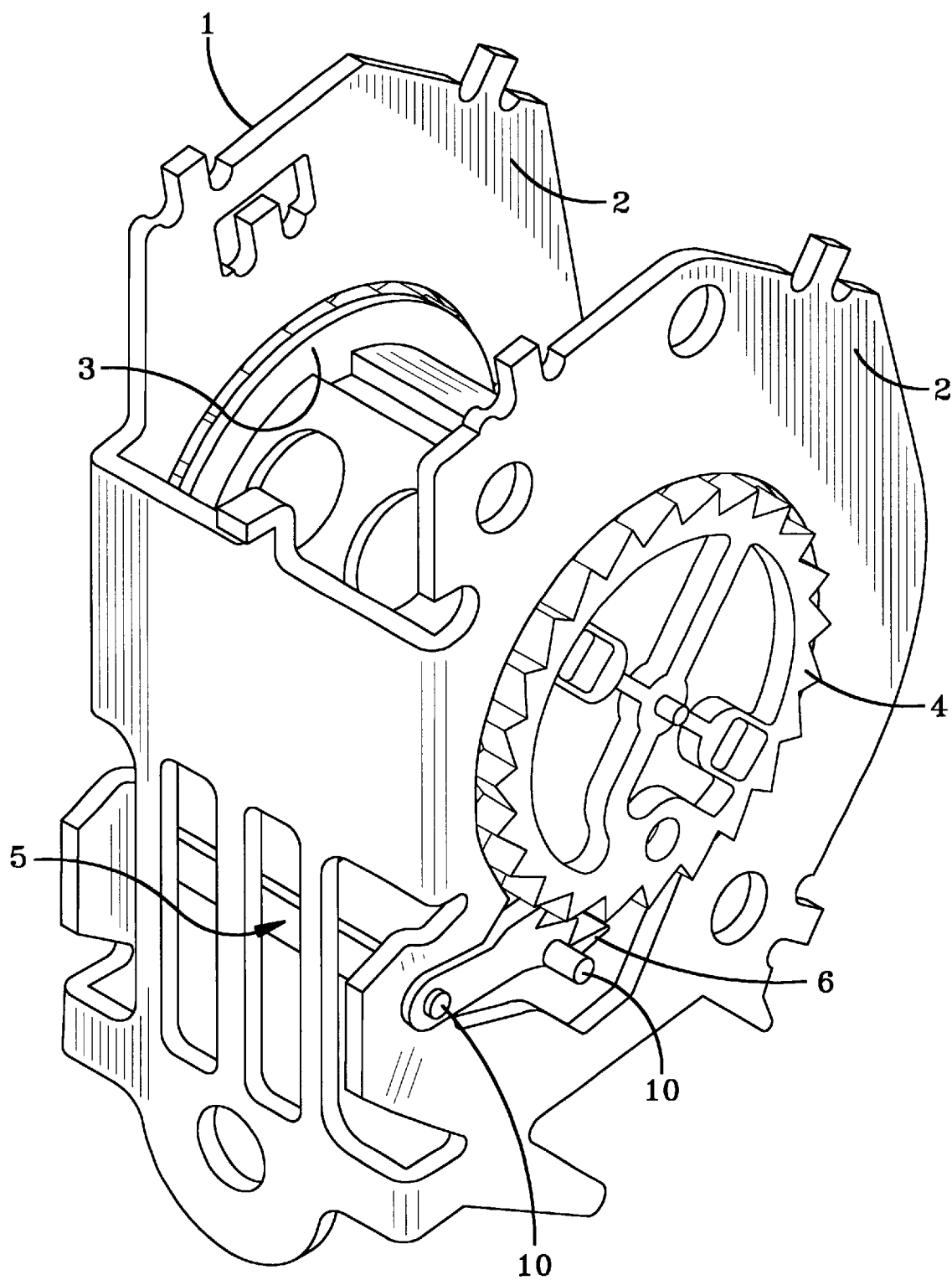
FIG. 1 is an isometric view of a seatbelt retractor incorporating a lockbar according to one embodiment of the present invention.

FIG. 1 shows a seatbelt retractor comprising a frame 1, with cut-outs in the sides 2 supporting a spool 3 for rotation about its longitudinal axis. Ratchet teeth 4 are arranged around the circumference of each end of the spool 3.

A lockbar 5 extends across frame 1 and has locking teeth 6 to engage the ratchet teeth 4 in the locking position when a crash is indicated in known manner.

Figure 2:
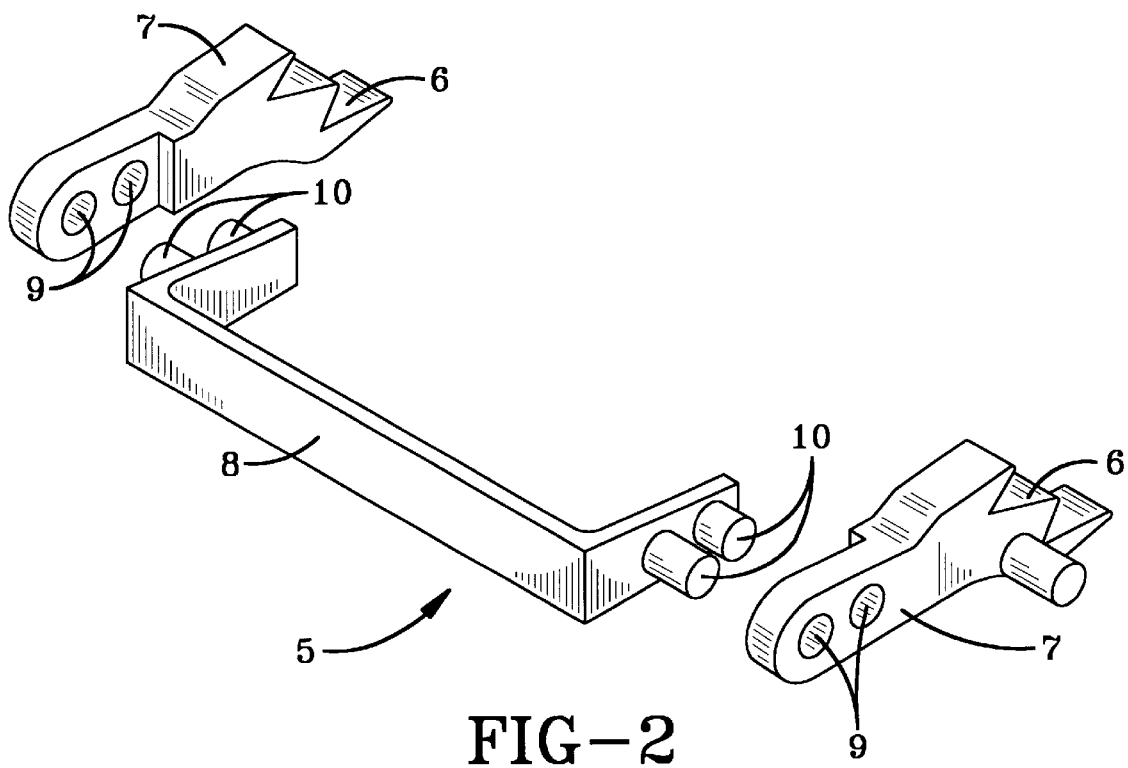
FIG. 2 is an exploded isometric view of the lockbar shown in FIG. 1.
Figure 5:
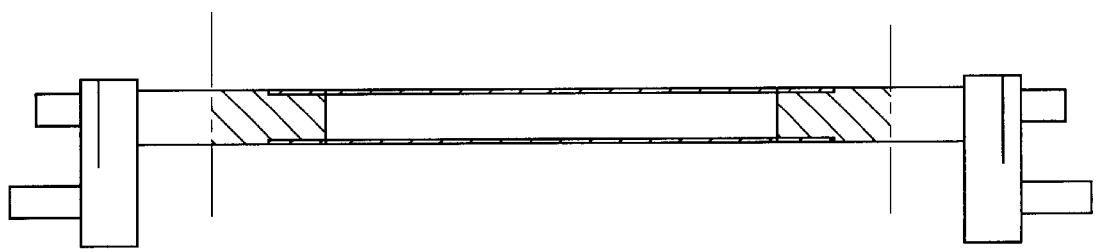
FIG. 5 is a cross-sectional view of the lockbar of FIG. 4.

As can be seen more clearly in FIG. 2 and FIG. 5, the lockbar 5 comprises two end pieces 7 on which the locking teeth 6 are formed, and a central elongate joining member 8.

In the lockbar of FIG. 2, the end pieces 7 have holes 9 into which pins 10 fit extending from the ends of the elongate joining member 8 in a permanent manner. The pins may be glued, crimped, pressed or welded to fix the end pieces 7 to the joining member 8. Other methods of fixing can also be used as will be evident to persons skilled in the art depending upon the materials used and the strength and specification required. The longer pair of pins 10 are also used a pivot features for the rotational datum of the lockbar assembly.

Figure 3:
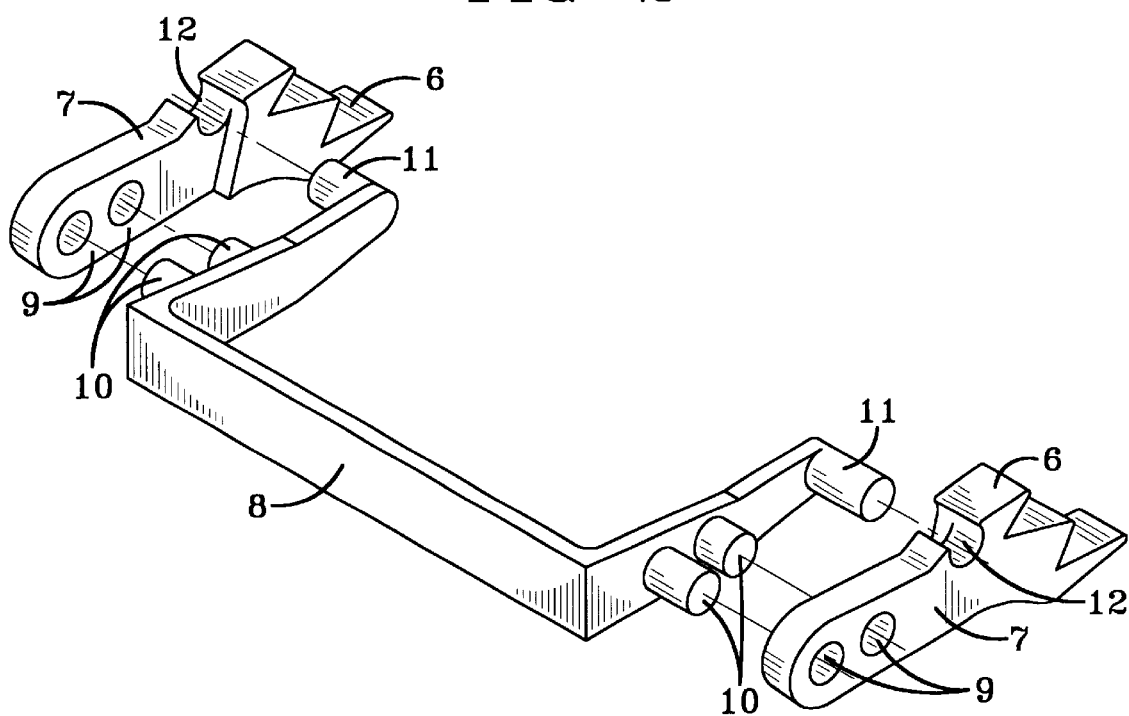
FIG. 3 is an exploded isometric view of a second embodiment of a lockbar according to the present invention.

In the lockbar of FIG. 3 the end pieces are again fixed by pins 10 extending through holes 9. Additionally, two further pins 11 are provided at each end of the joining member 8. These fit through cut-outs 12 on each end piece 7 so as to extend, after assembly, beyond the end pieces 7 and provide the necessary mechanism by which the lockbar is pivoted to bring the teeth 6 into engagement with the ratchet teeth on the spool 3 in the event of a crash.

Figure 4:
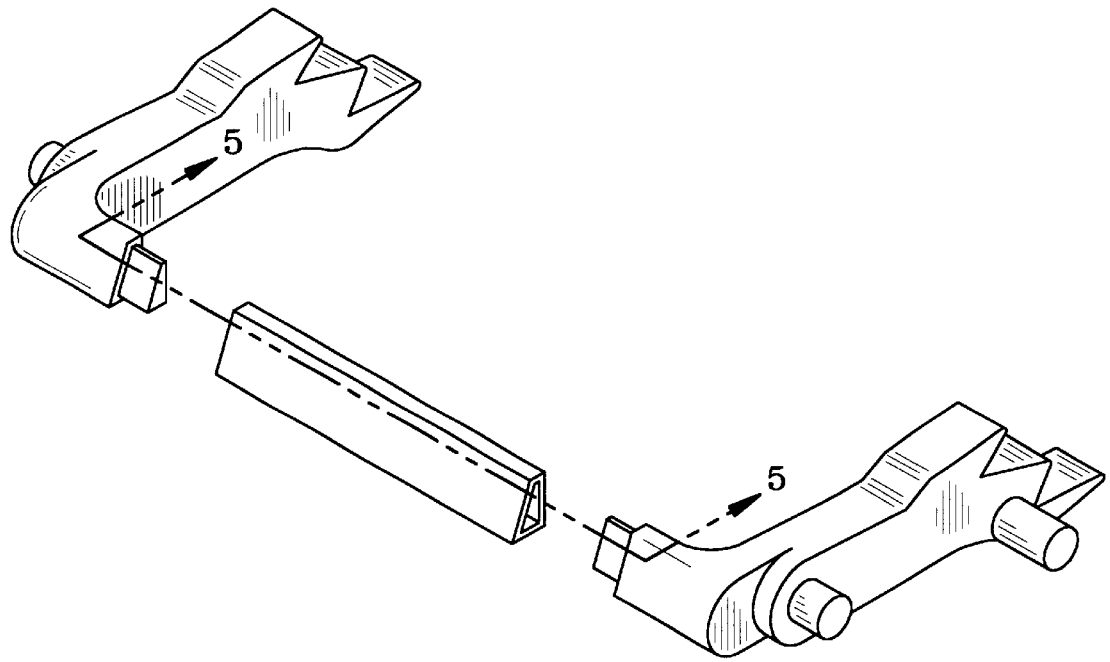
FIG. 4 is an exploded isometric view of a third embodiment of a lockbar according to the present invention.

The embodiment of the lockbar shown in FIG. 4 and FIG. 5 has a tubular prismatic joining member 8. Corresponding shaped extensions are formed at the end pieces 7 so as to fit into the ends of the joining member 8. The end pieces 7 are forged from aluminum and the joining member 8 is extruded aluminum.

It is understood that the invention is not limited to the particular construction and arrangement of parts herein illustrated and described, but embraces such modified forms thereof as come within the scope of the following claims.

We claim:

1. A lockbar for a seatbelt retractor comprising an elongate joining member and two end pieces joined to the joining member at opposite ends, the end pieces being made of a higher strength material than the joining member, both end pieces comprising the same material.

2. The lockbar for a seatbelt retractor according to claim 1 wherein the end pieces are of a generally L-shaped form.

3. The lockbar for a seatbelt retractor according to claim 1 wherein the joining member is an extrusion.

4. The lockbar for a seatbelt retractor according to claim 3 the joining member is tubular.

5. The lockbar for a seatbelt retractor according to claim 3 wherein the joining member is hollow.

6. The lockbar for a seatbelt retractor according to claim 5 wherein the joining member has a triangular cross-section.

7. The lockbar for a seatbelt retractor according to claim 1 wherein the joining member comprises aluminum.

8. The lockbar for a seatbelt retractor according to claim 1 wherein the joining member comprises glass-filled plastic.

9. The lockbar for a seatbelt retractor according to claim 1 wherein the end pieces are forged.

10. The lockbar for a seatbelt retractor according to claim 1 wherein the end pieces are die cast.

11. The lockbar for a seatbelt retractor according to claim 1 wherein the end pieces are injection molded plastic.

12. The lockbar for a seatbelt retractor according to claim 1 wherein the end pieces are forged aluminum.

13. The lockbar for a seatbelt retractor according to claim 1 wherein the end pieces are forged steel.

14. The lockbar for a seatbelt retractor according to claim 1 wherein the end pieces have projections and the joining member is hollow at least at its ends and to accommodate said projections on the end pieces to attach the end pieces to the joining member.

15. The lockbar for a seatbelt retractor according to claim 1 wherein the joining member has projections and the end pieces have holes therein to accommodate said projections on the joining member pieces to attach the end pieces to the joining member.

16. The lockbar for a seatbelt retractor according to claim 1 wherein the end pieces further comprise pin formations for guidance purposes that interact with features in a retractor mechanism to guide the end pieces into locking positions.

* * * * *